(12) United States Patent
Bennett

(10) Patent No.: US 9,047,835 B2
(45) Date of Patent: Jun. 2, 2015

(54) THERMAL AND POWER AWARE GRAPHICS PROCESSING

(75) Inventor: James Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 141 days.

(21) Appl. No.: 13/423,993

(22) Filed: Mar. 19, 2012

(65) Prior Publication Data

US 2013/0241942 A1 Sep. 19, 2013

Related U.S. Application Data

(60) Provisional application No. 61/524,538, filed on Aug. 17, 2011.

(51) Int. Cl.
| | | |
|---|---|---|
| *G09G 5/10* | (2006.01) | |
| *G09G 5/00* | (2006.01) | |
| *G09G 5/36* | (2006.01) | |
| G09G 5/37 | (2006.01) | |

(52) U.S. Cl.
CPC .................. *G09G 5/363* (2013.01); *G09G 5/37* (2013.01); *G09G 2340/02* (2013.01); *G09G 2360/121* (2013.01); *G09G 2370/022* (2013.01)

(58) Field of Classification Search
CPC . B61L 15/0036; B61L 15/009; G06F 3/1423; G09G 3/3406; G09G 3/3611; G09G 2360/145; G09G 2320/043; G09G 2320/048; G09G 2320/0626; G09G 2330/045; G09G 2330/12; G09G 2320/041
See application file for complete search history.

(56) References Cited

U.S. PATENT DOCUMENTS

| | | | |
|---|---|---|---|
| 2003/0080967 A1* | 5/2003 | Milch et al. ................... | 345/589 |
| 2007/0067136 A1 | 3/2007 | Conroy et al. | |
| 2007/0279407 A1 | 12/2007 | Vasquez et al. | |

(Continued)

FOREIGN PATENT DOCUMENTS

| | | |
|---|---|---|
| EP | 1 548 573 A1 | 6/2005 |
| KR | 10-2008-0029416 | 4/2008 |

OTHER PUBLICATIONS

International Search Report and Written Opinion for International Application No. PCT/US2012/051446, European Patent Office, Netherlands, mailed on Jan. 28, 2013.

(Continued)

*Primary Examiner* — Joni Richer
*Assistant Examiner* — Yi Wang
(74) *Attorney, Agent, or Firm* — Sterne, Kessler, Goldstein & Fox P.L.L.C.

(57) ABSTRACT

Embodiments for thermal and/or power aware graphics processing are provided. In an embodiment, a thermally and/or power adaptive graphics processing environment is presented. The graphics processing environment includes various thermally and/or power adaptive elements, each of which may be thermally and/or power aware (adaptive) in the sense that it may adapt at least one aspect of its operation and/or outputs based on thermal and/or power information to effectuate a change in graphics processing in any element (including itself) of the environment. This may include changing or causing a change in at least one of a graphics element, feature, setting, or characteristic based on thermal and/or power information. In an embodiment, thermal and/or power based adaptation may include software and/or hardware adaptation of graphics processing to affect thermal and/or power performance.

19 Claims, 6 Drawing Sheets

(56) References Cited

U.S. PATENT DOCUMENTS

| | | | |
|---|---|---|---|
| 2009/0153537 A1* | 6/2009 | Tada et al. | 345/212 |
| 2009/0153540 A1* | 6/2009 | Blinzer et al. | 345/212 |
| 2010/0149197 A1* | 6/2010 | Plut | 345/522 |
| 2011/0095899 A1 | 4/2011 | Saito et al. | |
| 2012/0001883 A1* | 1/2012 | Tarkoma | 345/211 |
| 2012/0044226 A1* | 2/2012 | Singh et al. | 345/211 |
| 2012/0062606 A1* | 3/2012 | Hymel | 345/690 |
| 2012/0293519 A1* | 11/2012 | Ribble et al. | 345/501 |

OTHER PUBLICATIONS

European Search Report for EP Application No. EP 12 00 5766, Munich, Germany, mailed on Dec. 5, 2012.

European Search Report for European Patent Application No. EP 12 00 5766, Germany, mailed on Mar. 21, 2013, 4 pages.

Communication from the Examining Division of the European Patent Office for European Patent Application No. EP 12 00 5766, Munich, Germany, mailed on Apr. 4, 2013, 8 pages.

Communication from the Examining Division of the European Patent Office for European Patent Application No. EP 12 00 5766, Munich, Germany, mailed on Oct. 31, 2013, 5 pages.

European Search Report for European Patent Application No. EP 13 00 3259, Munich, Germany, mailed on Oct. 31, 2013, 5 pages.

International Preliminary Report on Patentability directed toward counterpart International Application No. PCT/US2012/051446, issued Feb. 18, 2014 from The International Bureau of WIPO, Geneva, Switzerland; 11 pages.

Office Action directed to related Korean Patent Application No. 10-2013-7006425, mailed Nov. 27, 2014; 5 pages.

English-language abstract of Korean Patent Application Publication No. 10-2008-0029416; 1 page. Apr. 3, 2008.

* cited by examiner

THERMAL AND POWER AWARE GRAPHICS PROCESSING

CROSS REFERENCE TO RELATED APPLICATIONS

This application claims the benefit of U.S. Provisional Patent Application No. 61/524,538, filed Aug. 17, 2011.

BACKGROUND

1. Field of the Invention

The field of the invention relates generally to thermal and power aware graphics processing.

2. Background Art

In conventional graphics environments, graphics are processed based on fixed settings that are typically set by the user. Often, the user is unable to optimize the graphics settings based on current conditions (e.g., temperature, power, available resources, etc.). Further, as conditions within the graphics environment change (e.g., due to thermal, power, and/or user changes), the settings become even more sub-optimal, wasting available resources and degrading the user experience.

Accordingly, there is a need for thermal and/or power aware graphics processing.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the subject matter of the disclosure.

FIG. 1 illustrated an example thermal and/or power aware graphics processing environment.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
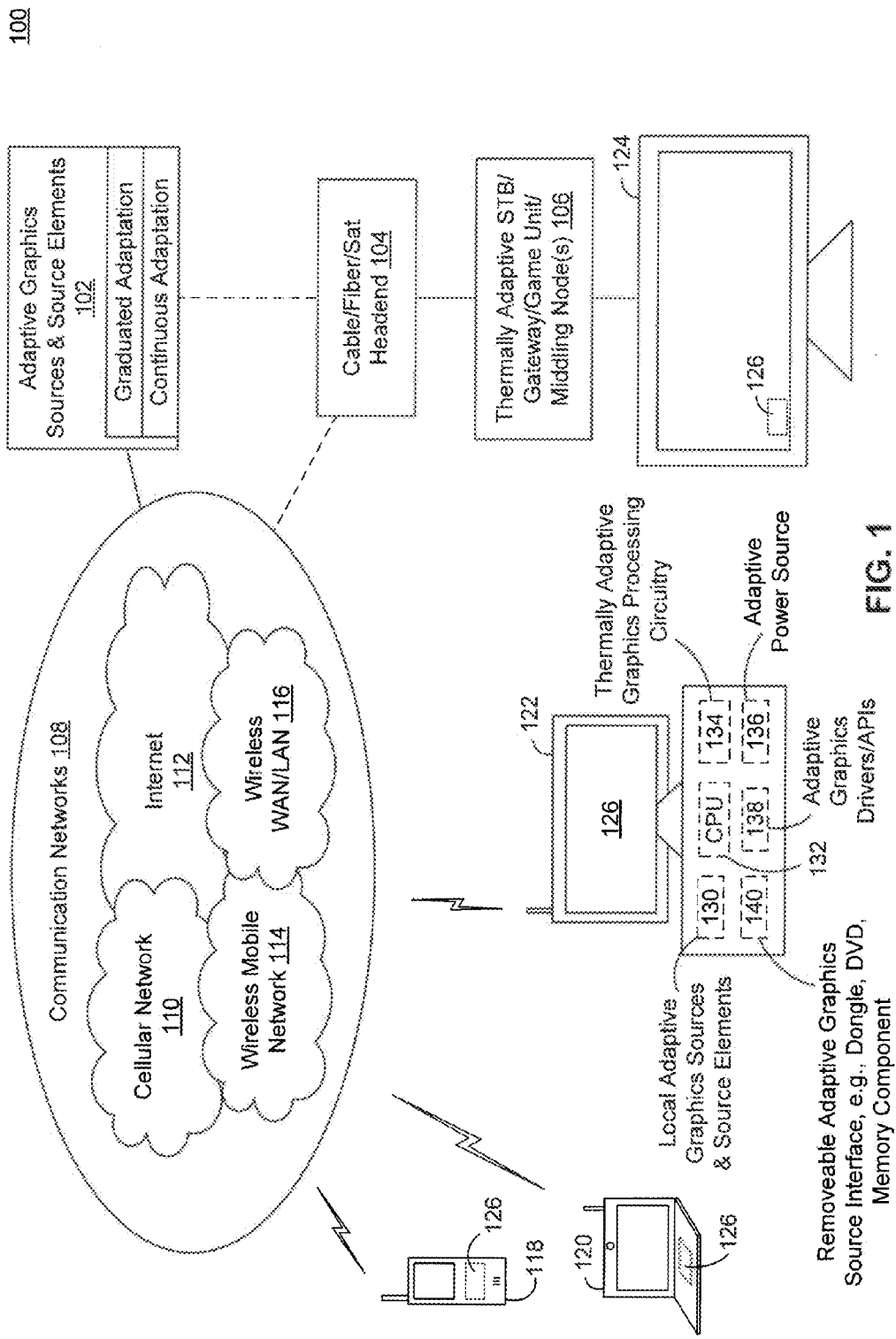

FIG. 1 illustrates an example thermal and/or power aware graphics processing environment 100. Example environment 100 is provided for the purpose of illustration only and is not limiting of embodiments of the present disclosure. As shown in FIG. 1, example environment 100 includes adaptive graphics sources and/or source elements 102, a headend 104, a middling node 106, (wired and/or wireless) communication networks 108, a smart phone 118, a laptop 120, a gaming device 122, and a display 124. As would be understood by a person of skill in the art based on the teachings herein, example environment 100 may include more or less elements than shown in FIG. 1.

According to embodiments, as further described below, any element of example environment 100 may be thermally and/or power aware (adaptive) in the sense that it may adapt at least one aspect of its operation and/or outputs based on thermal and/or power information to effectuate a change in graphics processing in any element (including itself) of example environment 100. This may include changing or causing a change in at least one of a graphics element, feature, setting, or characteristic based on thermal and/or power information.

Adaptive graphics sources and/or source elements 102 may include sources that contain or generate graphics and/or sources that contain or generate graphics elements. Graphics elements are elements that can be used to generate graphics and/or to render graphics on a physical medium, such as a display, for example. Adaptive graphics sources and/or source elements 102 may be embodied as servers and/or other associated program code that generate and store graphics and/or graphics elements.

Adaptive graphics sources and/or source elements 102 may deliver graphics and/or graphics elements to different remote end points. For example, adaptive graphics sources and/or source elements 102 may deliver graphics and/or graphics elements to smart phone 118, laptop 120, and/or gaming device 122 via communication networks 108. Communication networks 108 may include any combination of, without limitation, a cellular network 110, the Internet 112, a wireless mobile network 114, and a wireless Wide Area Network (WAN)/Local Area Network (LAN) 116.

Adaptive graphics sources and/or source elements 102 may also deliver graphics and/or graphics elements to display 124. Display 124 may be a television (TV) or a computer monitor. This may be performed directly or through one or more intermediate nodes, such as headend 104 and middling node 106. Headend 104 may be, without limitation, a cable, fiber, or satellite network headend. For example, headend 104 may be a server that delivers graphics/graphics elements. Middling node 106 may be, without limitation, a set-top box (STB), gateway/access point, or a gaming unit/console.

Adaptive graphics sources and/or source elements 102 may be thermally and/or power aware. As such, adaptive graphics sources and/or source elements 102 may adapt, independently, any feature or characteristic of its generated graphics or graphics elements based on thermal and/or power information. For example, adaptive graphics sources and/or source elements 102 may be delivering real-time graphics to display 124. In response to thermal and/or power information received from display 124 and/or in response to a control signal from display 124 (or from middling node 106, for example), adaptive graphics sources and/or source elements 102 may adapt the resolution, for example, of the graphics being delivered. In another example, the color depth of the graphics may be adapted. Adaptation may be graduated (stepwise) or continuous.

In addition, graphics adaptation may take place, independently, at one or more nodes, anywhere in the path between adaptive graphics sources and/or source elements 102 and display 124. For example, while the resolution of graphics being transmitted from adaptive graphics sources and/or source elements 102 to display 124 is being adapted at adaptive graphics sources and/or source elements 102, the color depth of the same graphics may be adapted at middling node 106 based on the same or different thermal and/or power information.

Thermal and/or power based adaptation of graphics may also take place in a user equipment device, such as smart phone 118, laptop 120, gaming device 122, and display 124.

The user equipment device may include a thermally and/or power aware (adaptive) system 126. System 126 may include one or more components, each of which may include a participant to enable thermally and/or power aware operation at the user equipment.

Without limitation and by way of example, system 126 may include local adaptive graphics sources and/or source elements 130, a central processing unit (CPU) 132, a thermally and/or power adaptive graphics processing circuitry 134, an adaptive power source 136, thermally and/or power adaptive graphics drivers and/or application programming interfaces (APIs) 138, and a removable adaptive graphics source interface 132.

Local adaptive graphics sources and/or source elements 130 may be thermally and/or power aware. As such, local adaptive graphics sources and/or source elements 130 may adapt, independently, any feature or characteristic of its generated graphics or graphics elements based on thermal and/or power information. Graphics sources and/or source elements 130 may be associated with an application program that generates user graphics, such as a video game, for example. Similarly, system 126 may interface, via removable graphics source interface 132, with a removable thermally and/or power aware graphics source. The removable graphics source may be a dongle, memory component, or Video Compact Disc (DVD), for example.

CPU 132 may be thermally and/or power aware. For example, CPU 132 may adaptively vary its mode of operation (e.g., speed) based on thermal and/or power information. For example, in response to power information indicating that the power supply is below a given threshold, CPU 132 may adapt its clocking frequency to extend the battery lifetime. In another example, CPU 132 may reduce its clocking frequency in response to thermal information indicating that graphics processing circuitry 134 is overheating, thereby forcing a less demanding mode of operation at graphics processing circuitry 134.

Thermally and/or power adaptive graphics processing circuitry 134 is thermally and/or power aware. As further described below, graphics processing circuitry 134 may rely on historical, current, and/or predicted thermal and/or power information to adapt graphics features, on a feature by feature basis. Adaptation may also depend, in part, on system characteristics and limitations, as well as performance goals (e.g., green performance requirements, battery lifetime requirements, etc.). For example, in deciding to increase the refresh rate, graphics processing circuitry 134 may take into account one or more of the maximum refresh rate of the display, thermal considerations of increasing the refresh rate (based on historical, current, and/or predicted thermal information), and power consumption considerations based on green performance requirements. Adaptive graphics drivers and/or APIs 138 may also be thermally and/or power aware, like graphics processing circuitry 134.

Thermal and/or power based adaptation by graphics processing circuitry 134 (and/or by adaptive graphics drivers and/or APIs 138) may be self-driven (i.e., initiated based on internal processes or functions). Alternatively or additionally, adaptation may be based on control signals received from external components, including user driven control signals. For example, in a battery-powered environment providing graphics at a first performance level, the user may be prompted, with the battery falling below a given threshold, to select between continuing at the first performance level (with a first associated remaining battery time) or to reduce graphics performance to a second performance level (with a second associated remaining battery time). The user input may cause adaptive graphics processing circuitry 134 to adapt one or more graphics feature, as appropriate, to ensure that the user selection is enabled.

In addition to adapting in response to external control signals, graphics processing circuitry 134 (and/or adaptive graphics drivers and/or APIs 138) may, in turn, communicate with external components to cause them to adapt based on thermal and/or power information. For example, in response to thermal and/or power information, graphics processing circuitry 134 may adapt one or more features of the graphics settings. In view of this adaptation, graphics processing circuitry 134 may communicate with a running thermally and/or power adaptive graphics application (e.g., a gaming application) to cause it to adapt its settings accordingly. For example, graphics processing circuitry 134 may have increased the display resolution such that anti-aliasing being performed by the graphics application is no longer needed and can be disabled, thereby lowering the processing requirements of the graphics application.

Furthermore, as further described below, graphics processing circuitry 134 may implement a thermally and/or power adaptive hardware architecture, which can be scaled, on the fly, based on thermal and/or power information. The thermally and/or power adaptive architecture may include one or more hardware/software components that are thermally and/or power adaptive.

An example scenario that illustrates thermal-based graphics adaptation according to an embodiment of the present disclosure is now described with respect to adaptive graphics sources and/or source elements 102, headend 104, middling node 106, and display 124. This example is provided for the purpose of illustration only and is not limiting. As would be understood by a person of skill in the art based on the teachings herein, similar thermal-based graphics adaptation may be applied within other elements or communication paths of example environment 100 and may also be extended to different environments than example environment 100.

As described above, in an embodiment, thermal information from display 124 (and/or middling node 106, headend 104, and adaptive graphics sources 102) may cause any one of adaptive graphics sources and/or source elements 102, headend 104, and middling node 106 to adapt its operation. In an example embodiment, this graphics adaptation may be driven by the below described constraints and objectives and may include adaptation of graphics contents as further described below.

Graphics processing is usually performed by graphics processors (on board or via graphics cards) within any of adaptive graphics sources 102, headend 104, middling node 106, smart phone 118, laptop 120, gaming device 122, and possibly even display 124. Such graphics processors and associated circuitry, along with other device circuitry and components, generate heat and consume power. For a given graphics configuration and a particular thermal dissipation environment (e.g., packaging characteristic, cooling systems, ambient temperature, etc.), a graphics processor is characterized by a thermal configuration, which includes the thermal characteristics of the graphics processor. Typically, for different graphics configurations and/or thermal dissipation environments, the graphics processor has different thermal configurations.

Generally, higher quality graphics/video output of the graphics processor generates higher heat and consumes greater energy. Absent power consumption concerns, viewers typically demand the highest possible graphics/video quality that is noticeably better than lower quality counterparts. Typically, graphics processors and associated circuitry using a variety of techniques (selected from an overall set of techniques via configurations/setup) receive graphics instructions and use graphics data and related data to generate raw or compressed video frame output.

Referring back to FIG. 1, adaptive graphics sources and/or source elements may generate first graphics content including, for example: (i) graphics instructions (e.g., graphic object commands such as move, shrink, expand, hide, overlap; draw commands such as lines and common shapes/objects; text commands, etc.), (ii) graphics data (e.g., 36 images of an object at 10 degree rotation resolution—yielding a 360 degree sequence of image data), graphics related data (e.g., texture maps), and (iii) graphics configuration commands (e.g., use shading with two light sources, distance of object discard, gamma, resolution, framing, etc.). Generally, most elements of the first graphics content are generated and delivered by adaptive graphics sources 102 with the expectation that they will be "consumed" (i.e., intended to be processed) by a node in the downstream path (e.g., headend 104, middling node 106, display 124). As such, changing one characteristic or element of the first graphics content may require changes to other characteristics and other graphics content elements.

In an embodiment, adaptive graphics sources 102 may generate the first graphics content "on the fly" in real time. Alternatively or additionally, adaptive graphics sources 102 may retrieve the first graphics content (or a portion thereof), predefined, from a storage. In an embodiment, adaptive graphics sources 102 delivers the first graphics content "as is" without regard to downstream thermal conditions. Alternatively, adaptive graphics sources 102 may adapt the first graphics content via real time processing or via a selection of predefined alternatives from the storage. Such adaptation may be in response to downstream thermal conditions, including thermal characteristics (e.g., of graphics processors) sensed/experienced (or predicted to be experienced) by one or more of adaptive sources 102, headend 104, middling node 106, and display 124. In embodiments, adaptation of graphics content may include modifying one or more of graphics instructions, graphics data, graphics related data, and graphics configuration commands contained in the graphics content.

In an embodiment, headend 104 may receive the first graphics content from adaptive graphics sources 102. Headend 104 may modify the first graphics content in response to thermal conditions sensed/experienced (or predicted) by one or more of headend 104, middling node 106, and display 124. In addition, headend may generate second graphics content. The second graphics content may be generated from the first graphics content, for example by modifying one or more of graphics instructions, graphics data, graphics related data, and graphics configuration commands contained in the first graphics content. In an embodiment, the first graphics content has a higher thermal loading characteristic (i.e., expected to cause higher thermal output by graphics processors) than the resulting second graphics content. In an embodiment, the second graphics content may be an overlay or otherwise merged along with the first graphics content, for a single viewing experience. Alternatively, the second graphics content may be generated separately from the first graphics content, and may be intended for separate consumption than the first graphics content (e.g., a separate window, frame, or object). As with adaptive graphics sources 102, headend 104 may adapt the second graphics content via real time processing or via a selection of predefined alternatives from storage.

In similar fashion, middling node 106 may receive the first graphics content and/or the second graphics content from headend 104. One or more of the first graphics content and the second graphics content may be adapted by middling node 106 in response to thermal conditions sensed/experienced (or predicted) by one or more of middling node 106 and display 124. In addition, middling node 106 may generate third graphics content from one or more of the first graphics content and the second graphics content, or separately from either the first graphics content and the second graphics content. The third graphics content may be generated to have a lower thermal loading characteristic than the first or second graphics content. Middling node 106 may further adapt the third graphics content via real time processing or via a selection of predefined alternatives from storage.

In an embodiment, middling node 106 may be the intended "consumer" of the first, second, or third graphics contents. In an embodiment, graphics content is consumed or processed to generate video frame data. Accordingly, in an embodiment, middling node 106 may process the first, second, or third graphics content to generate and deliver compressed video frame data (e.g., MPEG) to display 124 for decoding and display. In another embodiment, display 124 may have the ability to process graphics content. Accordingly, middling node 106 may forward, without processing, the first, second, or third graphics content to display 124. In yet another embodiment, middling node 106 may process a portion (e.g., the first graphics content) of the graphics contents and forward without processing another portion (e.g., the second or third graphics content) of the graphics content.

As would be understood by a person of skilled in the art based on the teachings herein, the above described example scenario may be applied in the same fashion with respect to power information or thermal and power information, instead of thermal information only. To support these example scenarios and as alluded to above, one or more elements of example environment 100 may include, without limitation, one or more of a) thermal/power information gathering capabilities and/or historical thermal/power information and prediction processing capabilities; b) adaptive power sources; c) graphics content generation capabilities; d) graphics content selection capabilities (pre-stored); e) modification capabilities of upstream sourced graphics content; and f) video frame data generation from graphics content capabilities.

Adaptive power source 136 may be thermally and/or power aware. As such, adaptive power source 136 may vary the supply voltage that it provides based on thermal and/or power information. For example, adaptive power source 136 may reduce the supply voltage (thus causing a reduction in overall graphics performance) in response to a control signal indicating overheating by graphics processing circuitry 134. In another example, adaptive power source 136 may reduce the supply voltage (thus causing a reduction in overall graphics performance) in response to a user selection, opting for a longer user experience time at the expense of lower graphics performance. In yet another example, adaptive power source 136 may increase the supply voltage to support faster processing, in view of an increase in graphics performance demand.

Figure 2:
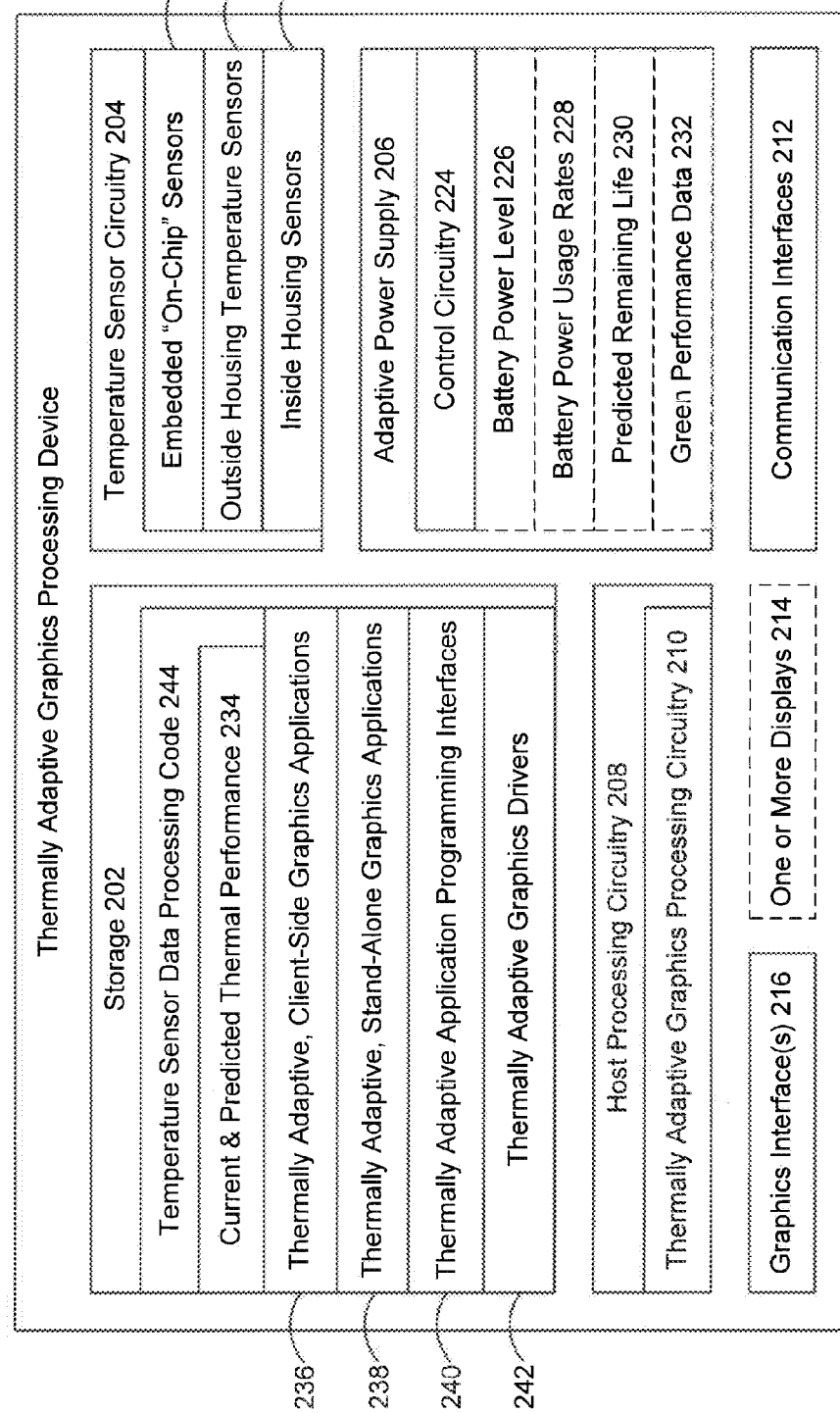
FIG. 2 illustrates an example thermal and/or power aware graphics processing device.

FIG. 2 illustrates an example thermal and/or power aware graphics processing device 200. Example device 200 is provided for the purpose of illustration only and is not limiting of embodiments of the present disclosure. Example device 200 may be part of a smart phone, gaming unit, tablet, or laptop, for example. One or more of the elements of example device 100 may be found in any one of the elements described above in FIG. 1. As shown in FIG. 2, example device 200 includes storage 202, a temperature sensor circuitry 204, an adaptive power supply 206, a host processing circuitry 208, a thermally and/or power adaptive graphics processing circuitry 210, communication interfaces 212, one or more displays 214, and graphics interfaces 216. As would be understood by a person of skill in the art based on the teachings herein, example device 200 may include more or less elements than shown in FIG. 2. As such, one or more of the elements shown in FIG. 2 may be optional.

Temperature sensor circuitry 204 include, without limitation, embedded "on-chip" temperature sensors 218, outside housing temperature sensors 220, and inside housing temperature sensors 222. Temperature sensor circuitry 204 thus generates various temperature sensor data, which can be used to determine current thermal conditions as well as to predict future thermal conditions, at different locations within device 200.

Storage 202 includes, without limitation, temperature sensor data processing code 244, current and/or predicted thermal performance data 234, thermally and/or power adaptive client-side graphics applications 236, thermally and/or power adaptive stand-alone graphics applications 238, thermally and/or power adaptive APIs 240, and thermally and/or power adaptive graphics drivers 242.

Processing code 244 includes one or more functions for processing temperature sensor data. For example, processing code 244 may include a code for processing temperature sensor data to generate current and/or predicted thermal performance data 234. The code may use historical and/or current temperature sensor data to make predictions regarding future thermal performance for various graphics performance settings. Predictions may include, for example, estimated times until a temperature threshold is reached at the various graphics performance settings or the predicted thermal effect of adjusting a graphics feature setting.

Adaptive applications 236 and 238, APIs 240, and graphics drivers 242 are thermally and/or power adaptive as described above with respect to adaptive graphics drivers and/or APIs 134, for example. Client-side graphics applications 236 include applications that may communicate with counterpart server-side applications. As such, thermal and/or power based adaptation of graphics applications 236 may additionally be performed by the server-side applications. Stand-alone applications 238 include applications with no server-side counterpart applications.

Host processing circuitry 208 is the main processor of example device 200. Host processing circuitry 208 may include an integrated graphics processing circuitry 210. Alternatively, graphics processing circuitry 210 may be separate from host processing circuitry 208. One or more thermally and/or power adaptive graphics applications, graphics APIs, graphics drivers, etc. may operate inside host processing circuitry 208.

In embodiment, host processing circuitry 208 and/or graphics processing circuitry 210 receive first graphics content from communication interfaces 212. The first graphics content may be from an upstream node and intended for downstream delivery. Host processing circuitry 208 and/or graphics processing circuitry may perform one or more of (a) adaptively modifying one or more elements of the first graphics content; (b) adaptively generating second graphic content (e.g., from the first graphics content); (c) modifying the first graphics content or generating the second graphic content based on local and/or downstream power/thermal information; (d) merging the first and second graphics contents and forwarding the merged content downstream; (e) merging a portion of the first graphics content and a portion of the second graphics content and forwarding the merged portions and unmerged portions of the first and second graphics content downstream; (f) forwarding the first and second graphics contents downstream separately; (g) processing the first graphic content and/or the second graphic content to generate video frame data and forwarding the video frame data downstream; and (h) encoding the generated video frame data for downstream delivery.

Figure 4:
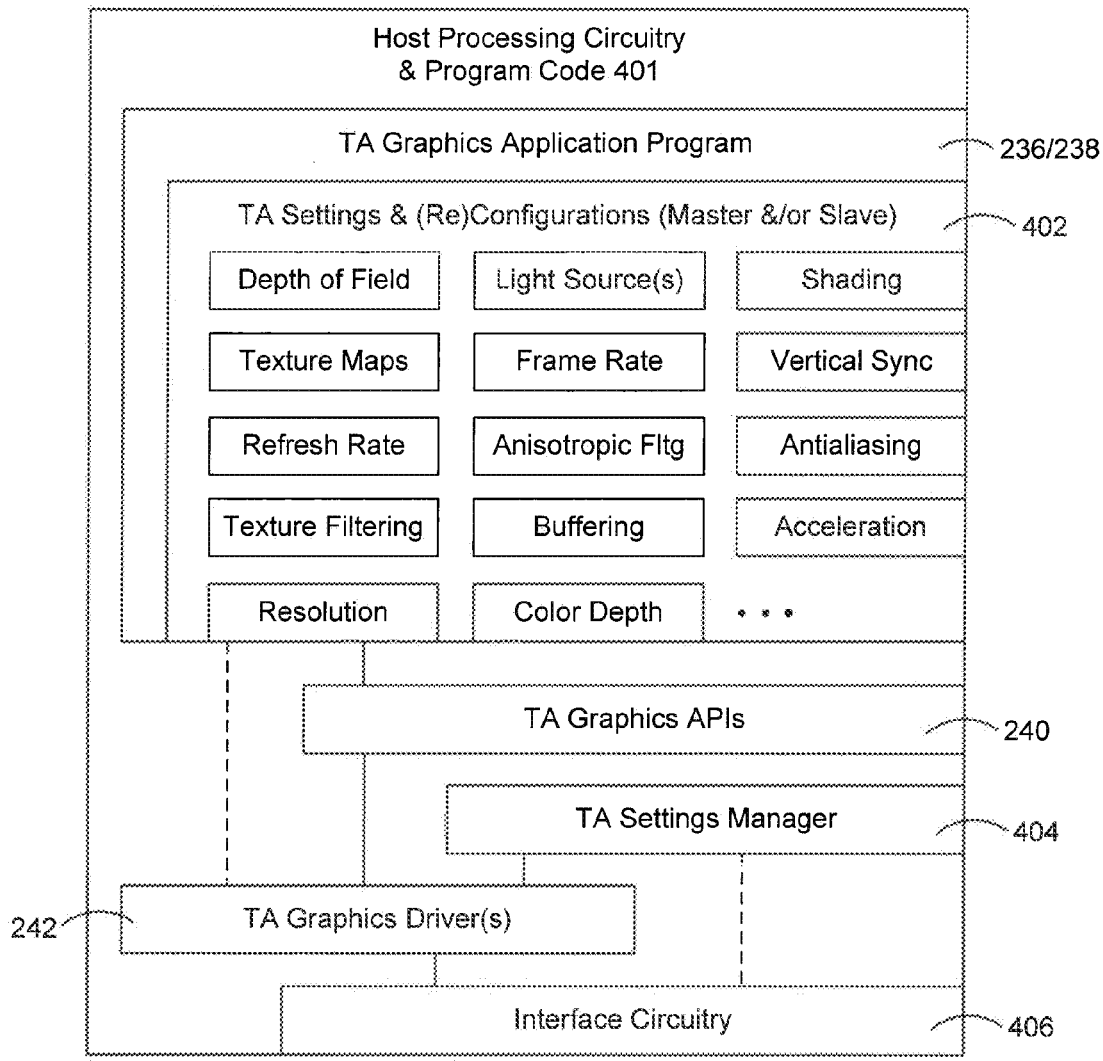
FIG. 4 illustrates an example host processing circuitry and program code.

FIG. 4 illustrates an example host processing circuitry 400. Example processing circuitry 400 is provided for the purpose of illustration only and is not limiting of embodiments of the present disclosure. As shown in FIG. 4, example host processing circuitry 400 includes host processing circuitry and program code 401 and an interface circuitry 406. As would be understood by a person of skill in the art based on the teachings herein, example host processing circuitry 400 may include more or less elements than shown in FIG. 4.

Host processing circuitry and program code 401 enable a thermally and/or power adaptive graphics application program 236/238, graphics APIs 240, settings managers 404, and graphics drivers 242 to execute. Thermal and/or power-based adaptation can take place, on a graphics feature basis, manually or automatically, in any one or more of graphics application programs 236 and 238, graphics APIs 240, settings managers 404, and graphics drivers 242.

For example, as shown in FIG. 4, graphics application program 236/238 may provide a graphics user interface 402. Graphics user interface 402 can be used to adjust a number of graphics features, some or all of which may be thermally and/or power adaptive. Upon making a manual or automatic adjustment to a graphics feature, a built-in system hierarchy may determine whether or not and the extent to which the adjustment is actually performed. For example, although graphics user interface 402 provides an option to adjust the refresh rate, this setting may be constrained by what the display can handle. As such, certain adjustments by the application program 236/238 may not always result in corresponding changes in the feature adjusted.

Certain graphics features may be thermally and/or power adapted in one or more locations within the built-in system hierarchy. For example, a feature may be thermally adaptable in application program 236/238, and also thermally and/or power adaptable in graphics APIs 240. On the other hand, other features, such as the depth of field, for example, can only be set in the application program. As such, thermal and/or power based adaptation can be centralized or distributed, on a feature by feature basis.

Interface circuitry 406 may include one or more interfaces that allow host processing circuitry 400 to communicate with external components. In an embodiment, interface circuitry 406 include an interface that allows host processing circuitry 400 to communicate with external graphics processing circuitry, such as graphics processing circuitry 210.

Referring back to FIG. 2, graphics processing circuitry 210 may be a graphics processing unit (GPU) or a visual processing unit (VPU). Graphics processing circuitry 210 includes specialized circuitry for processing graphics data. In an embodiment, graphics processing circuitry 210 is integrated within host processing circuitry 208. Alternatively, graphics processing circuitry 210 is external to host processing circuitry 208. As further described below, graphics processing circuitry 210 may be thermally and/or power adaptive, both in terms of software and hardware.

Figure 3:
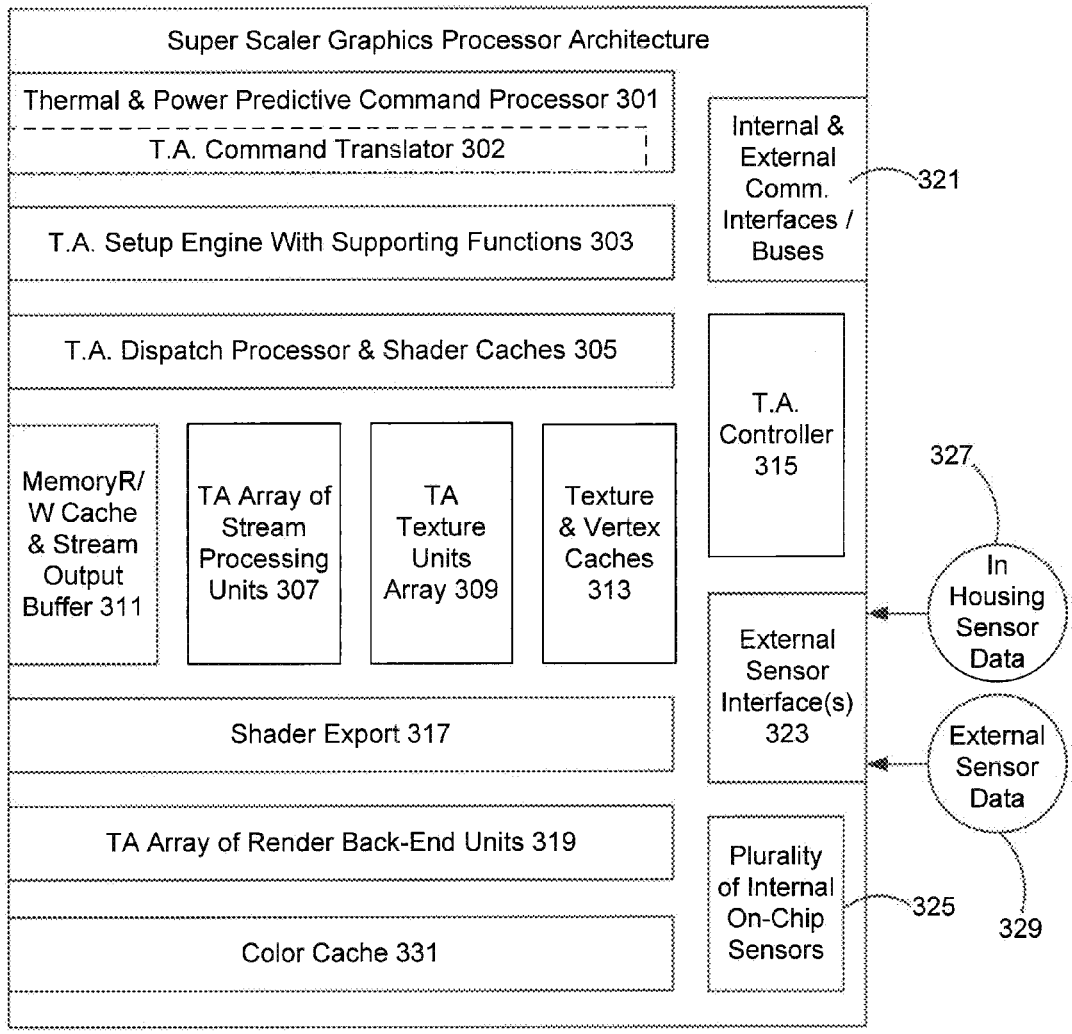
FIG. 3 illustrates an example graphics processor architecture.

FIG. 3 illustrates an example graphics processor architecture 300. Example graphics processor architecture 300 is provided for the purpose of illustration only and is not limiting of embodiments of the present disclosure. Example architecture 300 may be an embodiment of graphics processing circuitry 210.

As shown in FIG. 3, example architecture 300 may include a thermally and/or power predictive command processor 301, a thermally and/or power adaptive command translator 302, a thermally and/or power adaptive setup engine with supporting functions 303, a thermally and/or power adaptive dispatch processor and shader caches 305, a thermally and/or power adaptive array of stream processing units 307, a thermally and/or power adaptive array of texture units 309, a memory read/write (R/W) cache and stream output buffer 311, texture and vertex caches 313, a thermally and/or power adaptive controller 315, a shader export module 317, a thermally and/or power adaptive array of render back-end units 319, a color cache 331, internal and external communication interfaces and/or buses 321, external sensor interface(s) 323, and a plurality of internal on-chip sensors 325. As would be understood by a person of skill in the art based on the teachings herein, example graphics architecture 300 may include more or less elements than shown in FIG. 3. For example, some of the shown elements may be optional, and can thus be eliminated or located outside of example architecture 300.

Example graphics processor architecture 300 may adapt, one or more of its thermally and/or power adaptive elements, in response to thermal and/or power information. Thermal and power information may be internal, i.e., produced by on-chip sensors 325, or external, i.e., received by external sensor interface(s) 323 (e.g., in housing sensor data 327 and external sensor data 329). Further, thermal and/or power based adaptation may be centralized (i.e., initiated by a sole decision making element, e.g., controller 315) or distributed (i.e., self-initiated by the adapting element itself), and may be performed by internal and/or external elements.

In embodiments, thermal and/or power based adaptation may include software and/or hardware adaptation of graphics processing to affect thermal and/or power performance. For example, dispatch processor 305 controls thread execution units, allocating graphics tasks to stream processing units 307, texture units 309, and/or render back-end units 319, based on requirements and priorities. Thermal and/or power based adaptation by dispatch processor 305 may involve, for example, scaling itself down to handle a lower number of threads and/or a lower number of stream processing units 307, texture units 309, and render back-end units 319. This adaptation may be performed by adapting the software that controls the operation of dispatch processor 305.

Alternatively or additionally, thermal and/or power based adaptation by dispatch processor 305 may involve adjusting, on the fly, the number of stream processing units 307, texture units 309, and/or render back-end units 319 that are powered up. This adaptation thus involves changing the graphics processing hardware architecture to change the thermal and/or power performance. In an embodiment, dispatch processor 305 performs this adaptation in response to a control signal from controller 315.

Referring back to FIG. 2, adaptive power supply 206 includes control circuitry 224 that may be thermally and/or power adaptive. Optionally, control circuitry 224 generates and/or has available various power/thermal performance data, including, without limitation, battery power level 226, battery power usage rates 228, predicted remaining life 230, and green performance data 232.

Control circuitry 224 may rely on the power/thermal performance data to vary the supply voltage provided by adaptive power supply 206. For example, control circuitry 224 may reduce the supply voltage (thus causing a reduction in overall graphics performance) in response to green performance data 232 indicating overheating by graphics processing circuitry 210. In another example, control circuitry 224 may use battery power usage rates 228 (which may include battery power usage rates for various graphics performance settings) and/or predicted remaining life 230 (which may include predicted remaining life for various graphics performance settings) to increase or decrease the supply voltage in response to a user selection, opting for a particular graphics performance setting. In another example, control circuitry 224 may adjust the supply voltage in response to preset triggers. For example, if battery power level 226 drops below a predetermined threshold, control circuitry 224 may be preset to reduce the supply voltage by a certain amount, thereby reducing graphics performance and increasing remaining battery life.

Graphics interface(s) 216 include interfaces that may be used to connect example device 200 to external display systems, to display graphics processed by example device 200.

Communication interfaces 212 include wired and/or wireless interfaces, which may be used by example device 200 to communicate with external systems. For example, as shown in FIG. 1, a thermally and/or power aware device (e.g., 124) may communicate with remote adaptive graphics sources and/or source elements 102, headend 104, or middling node 106. In embodiments, each of these remote elements may include a thermally and/or power adaptive graphics source, which may participate in thermal and/or power based adaptation of graphics at the device.

Figure 5:
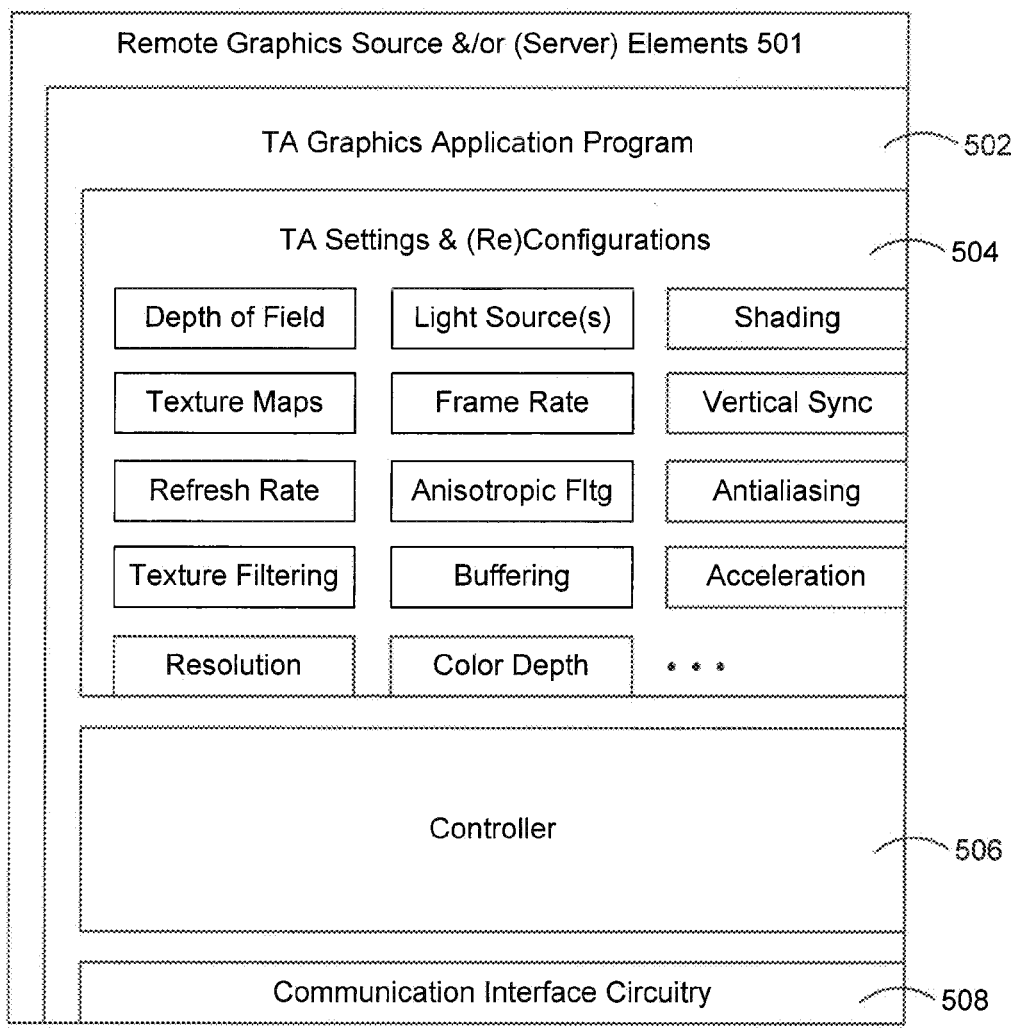
FIG. 5 illustrates an example remote graphics source.

FIG. 5 illustrates an example remote graphics source 500. Example remote graphics source 500 is provided for the purpose of illustration only and is not limiting of embodiments of the present disclosure. As shown in FIG. 5, example remote graphics source 500 includes a graphics source and/or server elements 501, a controller 506, and communication interface circuitry 508. Remote graphics source 500 may further include a thermally and/or power adaptive graphics application program 502. As would be understood by a person of skill in the art based on the teachings herein, example remote graphics source 500 may include more or less elements than shown in FIG. 5.

Remote graphics source and/or server elements 501 may include sources that contain or generate graphics and/or sources that contain or generate graphics elements. Graphics elements are elements that can be used to generate graphics and/or to render graphics on a physical medium, such as a display, for example. Remote graphics source and/or server elements 501 may be thermally and/or power aware. As such, remote graphics source and/or server elements 501 may adapt, independently, any feature or characteristic of its generated graphics or graphics elements based on thermal and/or power information.

Graphics application program 502 may include a graphics interface 504 that can be used to adjust a number of graphics features, some or all of which may be thermally and/or power adaptive. In an embodiment, each adaptable graphics feature may be adapted in a graduated or a step-wise fashion.

Graphics application program 502 may be the server-side of a graphics application, which further includes a client-side application at a remote device. Thermal and/or power based adaptation of graphics by the application may be performed by the client-side and/or the server-side application, on a feature by feature basis. Adaptation may be initiated and performed by the client-side application and communicated to the server-side application; initiated by the client-side application, performed by the server-side application (and communicated to the client-side application); initiated and performed by the server-side application and communicated to the client-side application; or initiated by the server-side application, performed by the client-side application (and communicated to the server-side application).

In an embodiment, controller 506 uses communication interface circuitry 508 to initiate, perform, or communicate thermal and/or power graphics adaptation to a remote device. Controller 506 may communicate, for example, with the CPU, graphics applications, graphics APIs, graphics drivers, or GPU of the remote device. For example, controller 506 may communicate with the graphics API (e.g., DirectX) to cause thermal and/or power based adaptation in a graphics application program. The same graphics application program may also be adapted locally, through the same graphics API, by the GPU, for example, of the device. As such, the graphics API serves an interface for both local and remote based adaptation of the graphics application program.

Figure 6:
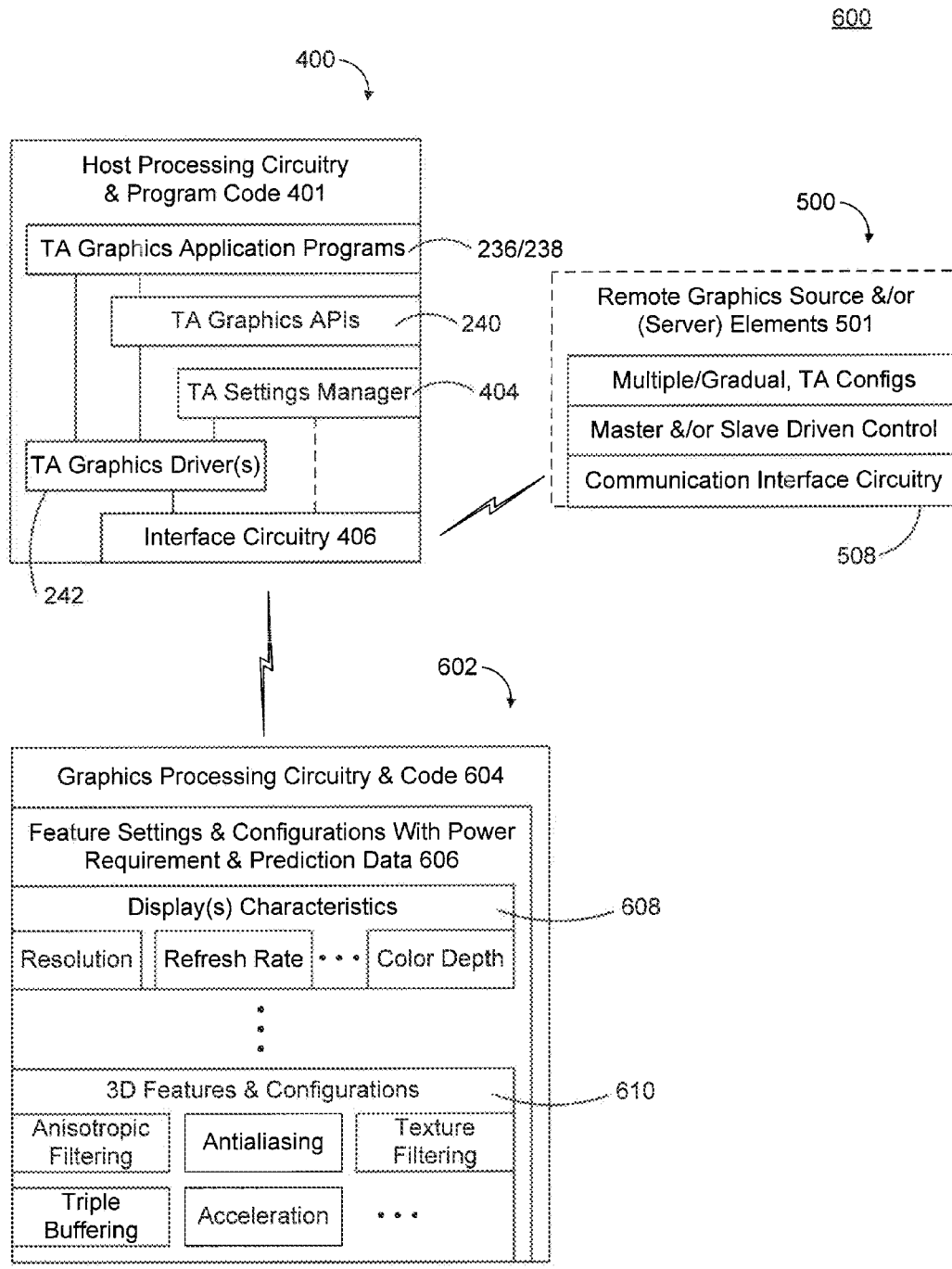
FIG. 6 illustrates an example thermal and/or power aware graphics processing environment.

FIG. 6 illustrates an example thermal and/or power aware graphics processing environment 600. Example environment 600 is provided for the purpose of illustration only and is not limiting of embodiments of the present disclosure. As shown in FIG. 6, example environment 600 includes example host processing circuitry 400, example remote graphics source 500, and a GPU 602. In an embodiment, host processing circuitry 400 and GPU 602 may be integrated within the same circuitry and/or device.

GPU 602 includes graphics processing circuitry and code 604. Graphics processing circuitry and code 604 support the processing of graphics data. GPU 602 also includes data 606, which may include graphics feature settings (includes current settings for various graphics features), graphics configurations with associated power requirement, and/or prediction data (e.g., predicted thermal and/or power consumption data for various graphics configurations and/or various graphics feature settings). In addition, GPU 602 may include display(s) characteristics data 608 (e.g., resolution, refresh rate, color depth, etc.) and 3D features and configurations data 610.

GPU 602 may use one or more of data 606, 608, and 610 in making thermal and/or power based adaptation of graphics. For example, before adapting the graphics resolution, GPU 602 may use data 608 to check that the resolution does not exceed the display resolution. Then, GPU 602 may use data 606 to check the predicted effect of the resolution change on power and/or thermal goals. GPU 602 also uses data 606 (the current graphics feature settings) in generating its graphics output. The graphics feature settings may be defined by one or more elements of the system. For example, a (local or remote) graphics application program, API, settings manager, or graphics driver may set certain graphics features, while the display sets other graphics features based on its limitations.

As shown in FIG. 6, host processing circuitry 400, remote graphics source 500, and GPU 602 may interact with each other to effectuate thermal and/or power based adaptation of graphics. Initiation and performance of thermal and/or power based graphics adaptation can be done, on the fly, on a graphics feature basis, by host processing circuitry 400, remote graphics source 500, and/or GPU 602. Further, as described above, thermal and/or power based graphics adaptation may be initiated and/or performed, on a graphics feature basis, by one or more elements of each of host processing circuitry 400, remote graphics source 500, and GPU 602.

Information regarding thermal and/or power based adaptation is communicated around, as necessary, in example environment 600 so that all graphics participants can also adapt their behavior accordingly. For example, upon lowering the graphics resolution, GPU 602 may communicate this change to graphics application programs 236/238 of host processing circuitry 400. In response, graphics application programs 236/238 may adjust their own graphics settings, accordingly. For example, graphics application programs 236/238 may have been operating with a higher resolution setting than the one set by GPU 602. Continuing with the same higher setting, given that GPU 602 has limited the resolution to a lower setting, would be wasteful. As such, graphics application programs 236/238 also reduce their resolution setting.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A graphics system, comprising:
    first interface circuitry configured to receive first graphics content, wherein the first graphics content includes graphics data;
    processing circuitry, coupled to the first interface circuitry, configured to process the first graphics content, based on thermal information, to generate second graphics content, wherein the processing circuitry is configured to modify the graphics data to generate the second graphics content, the first graphics content having a higher thermal loading characteristic than the second graphics content, the processing circuitry further configured to process the second graphics content to generate video frame data from the second graphics content, wherein the thermal loading characteristics of the first graphics content and the second graphics content indicate respective predicted thermal outputs of the processing circuitry; and
    second interface circuitry configured to deliver the video frame data.

2. The graphics system of claim 1, further comprising a display, wherein the second interface circuitry is configured to deliver the video frame data to the display.

3. The graphics system of claim 1 used with a supporting display device, wherein the second interface circuitry is configured to deliver the video frame data to the supporting display device.

4. The graphics system of claim 1, wherein the first graphics content further comprises graphics configuration commands, and wherein the processing circuitry is further configured to modify at least one of the graphics configuration commands to generate the second graphics content.

5. A graphics device, comprising:
interface circuitry configured to receive first graphics content and power consumption information, wherein the first graphics content includes graphics data; and
processing circuitry, coupled to the interface circuitry, configured to adaptively process the first graphics content based on the power consumption information to generate second graphics content, wherein the processing circuitry is configured to modify the graphics data to generate the second graphics content,
the processing circuitry further configured to process the second graphics content to generate an output and to deliver the output to support a visual presentation, wherein the power consumption information comprises predictive power consumption information.

6. The graphics device of claim 5, wherein the power consumption information comprises thermal information.

7. The graphics device of claim 6, further comprising a device housing, wherein the thermal information originates at least in part from a location remote from the device housing.

8. The graphics device of claim 5, wherein the power consumption information comprises power source information.

9. The graphics device of claim 5, wherein the power consumption information comprises historical power consumption information.

10. The graphics device of claim 5, wherein the output comprises a modified version of the first graphics content.

11. The graphics device of claim 5, wherein the output comprises video frame data.

12. The graphics device of claim 5 used with a supporting device, wherein the interface circuitry is configured to receive the first graphics content from the supporting device.

13. The graphics device of claim 5, wherein the interface circuitry is configured to receive the first graphics content from a storage.

14. The graphics device of claim 5, wherein the first graphics content is generated at least in part from a graphics software application.

15. The graphics device of claim 5, wherein the processing circuitry is configured to deliver the output to at least one of: a graphics application programming interface, a graphics settings manager, and a graphics driver.

16. The graphics device of claim 5, wherein the first graphics content further comprises graphics configuration commands, and wherein the processing circuitry is further configured to modify at least one of the graphics configuration commands to generate the second graphics content.

17. A method of graphics processing in a device, the method comprising:
receiving user input indicating a desired visual experience;
establishing a first graphics processing configuration of the device based on the desired visual experience, wherein the first graphics processing configuration corresponds to a first setting of a graphics processing circuitry of the device;
processing received graphics content using the graphics processing circuitry according to the first graphics processing configuration;
evaluating power consumption information of the device, wherein the power consumption information comprises predictive power consumption information;
establishing a second graphics processing configuration based on the evaluation of the power consumption information, wherein the second graphics processing configuration corresponds to a second setting of the graphics processing circuitry of the device, and wherein the first graphics processing configuration results in a device output that is a closer match to the desired visual experience than a device output of the second graphics processing configuration; and
processing the received graphics content using the graphics processing circuitry according to the second graphics processing configuration, wherein processing the received graphics content according to the second graphics processing configuration comprises modifying the received graphics content to generate a modified graphics content and processing the modified graphics content using the graphics processing circuitry.

18. The method of claim 17, wherein the power consumption information comprises thermal information.

19. The method of claim 17, wherein the received graphics content comprises graphics data, and wherein modifying the received graphics content comprises modifying the graphics data to generate the modified graphics content.

* * * * *